(12) United States Patent
Krueger

(10) Patent No.: US 6,959,176 B1
(45) Date of Patent: Oct. 25, 2005

(54) COMMUNICATIONS TERMINAL

(75) Inventor: Werner Krueger, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/958,368

(22) PCT Filed: Apr. 3, 2000

(86) PCT No.: PCT/DE00/01022

§ 371 (c)(1),
(2), (4) Date: Oct. 5, 2001

(87) PCT Pub. No.: WO00/60833

PCT Pub. Date: Oct. 12, 2000

(30) Foreign Application Priority Data

Apr. 7, 1999 (DE) ................................ 199 15 694

(51) Int. Cl.[7] .............................................. H04B 1/06
(52) U.S. Cl. .................... 455/234.1; 455/136; 455/138
(58) Field of Search ............................. 455/234.1, 136, 455/138, 570; 329/395, 387.01, 390.03, 391, 329/392; 704/225, 227, 233

(56) References Cited

U.S. PATENT DOCUMENTS 6,205,217 B1 * 3/2001 Nobusawa ................... 379/395

FOREIGN PATENT DOCUMENTS

| EP | 331435 A2 * | 9/1989 | ............ H04B 1/38 |
| EP | 0 682 437 A2 | 11/1995 | |
| EP | 0 717 547 A2 | 6/1996 | |
| EP | 810722 A2 * | 12/1997 | ............ H03G 3/30 |
| EP | 0 836 310 A1 | 4/1998 | |
| GB | 2 327 562 | 1/1999 | |
| WO | WO 99/05840 | 2/1999 | |

OTHER PUBLICATIONS

Digitale Mobilfunksystem.
Digitale Sprachsignal-verarbeitung.

* cited by examiner

*Primary Examiner*—Melur Ramakrishnaiah
(74) *Attorney, Agent, or Firm*—Bell, Boyd & Lloyd LLC

(57) ABSTRACT

A communications terminal, in particular a mobile radio station, having an AF amplifier stage, which includes a gain adjustment for adjusting the gain factor as a function of the speech volume.

11 Claims, 1 Drawing Sheet

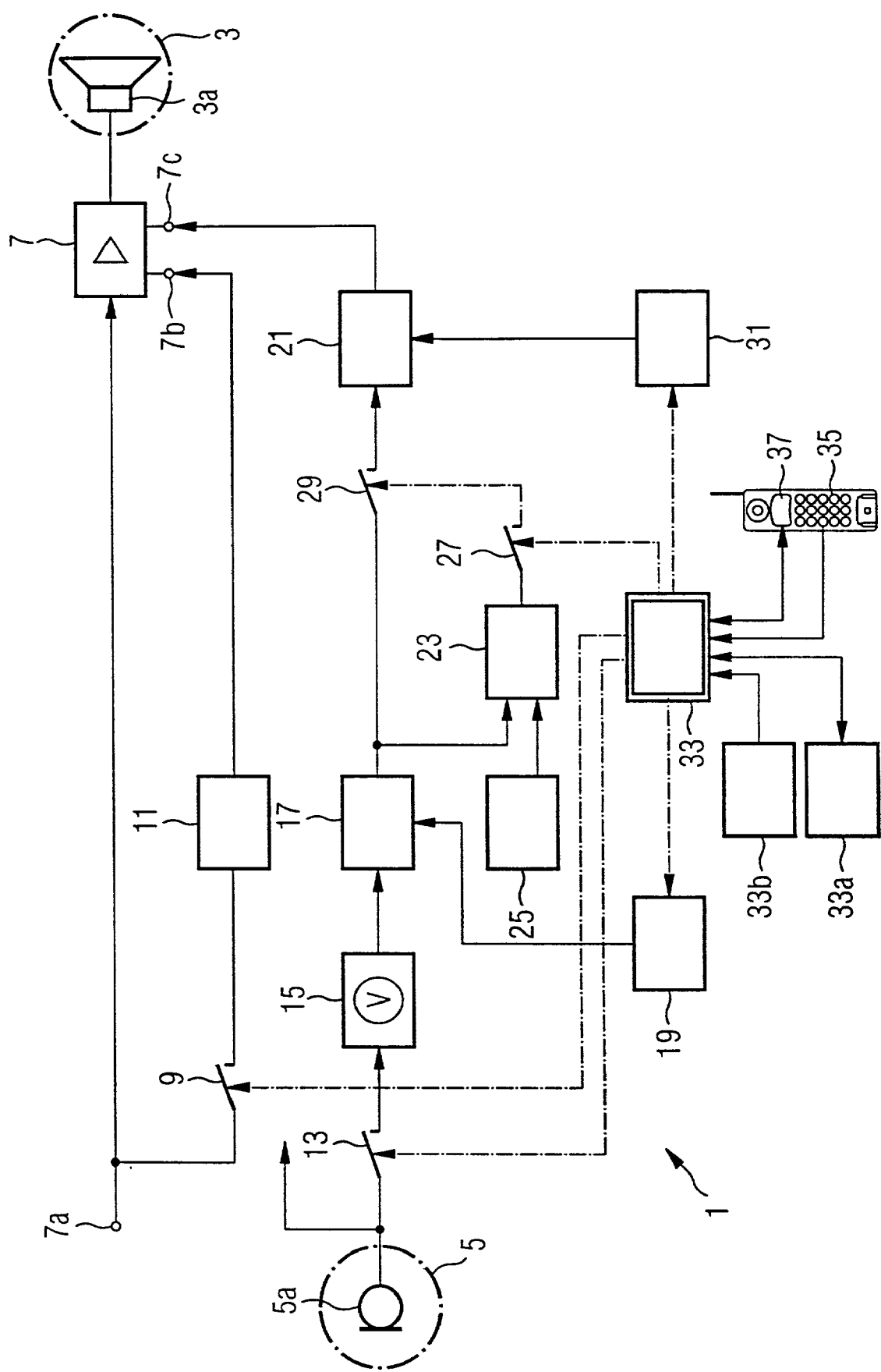

COMMUNICATIONS TERMINAL

BACKGROUND OF THE INVENTION

In the past, telephone connections were generally operated from stationary terminals, which are normally installed in locations which are relatively well shielded from environmental noise (within rooms, telephone booths). However, the explosive growth of mobile telephony has now resulted in a primary factor being the need to set up and maintain telephone connections even in extremely poor acoustic conditions which are varying rapidly and severely. The AF amplifier stages in modern terminals, in particular in mobile radio terminals, are thus equipped with systems, which can be operated manually or under menu control, for adjusting the volume of the receiver capsule. The user can use the appropriate adjustment key or menu function to manually correct the instantaneous receiver volume when the acoustic environmental conditions are varying.

These manual corrections are, to a greater or lesser extent, cumbersome, and menu-controlled adjustment processes require the necessity to monitor the display area on the terminal, thus resulting in the necessity to at least briefly interrupt the communication.

In addition, the correction process must be repeated whenever there is any significant change in the environmental volume and, in the end, this makes it considerably more difficult to hold a smooth conversation while concentrating on it. Finally, the necessity to manually correct the receiver volume in certain situations, for example while driving a vehicle or while operating a machine, involves a certain safety risk.

Thus, in practice, the adjustment capabilities available with the prior art frequently are not used.

The present invention is, therefore, directed toward specifying a communications terminal in which the receiver volume is matched easily and more safely to the environmental conditions.

SUMMARY OF THE INVENTION

The present invention includes knowledge relating to psychoacoustic relationships, which can be outlined as follows:

Let us assume there is a voice connection between a subscriber A who is using a mobile telephone in a city area while the environmental volume is fluctuating severely, and a subscriber B has a communication partner, who may himself use any desired terminal. At the subscriber A end, the environmental noise increases (for example, due to an increase in road noise, aircraft noise, a train going past etc.), while the voice connection is in existence. The subscriber A reacts to this by involuntarily increasing the volume of his speech. Conversely, the subscriber A reacts to a reduction in the volume of the environmental noise by involuntarily speaking more quietly. This behavior is supposedly due to the fact that, when two conversation partners located at the same point are talking, the change in the environmental volume affects both of them to the same extent, and the comprehensibility of one's own words for the person one is conversing with, on the one hand, and a volume level which is as reasonable as possible, on the other hand, can be ensured by adaptation of the speech volume. However, in the course of a telephone connection, such behavior which is intended for direct personal conversations makes only limited sense since noise-compensated transmitter capsules in telephones are matched to the nearby area, and changes in the environmental volume are passed on to the subscriber B only in very attenuated form. The subscriber B, therefore, perceives the fact that the subscriber A is raising and lowering his voice as being at least unmotivated, if not annoying.

However, the outlined relationship opens up the technical capability to adjust the receiver volume of a telephone by detecting the speech volume of the user on this telephone. Surprisingly, this means that there is no need to separate the environmental noise from the user's speech, which is technically difficult and at least complex. It has been found to be sufficient to detect the speech volume and to actuate the gain adjustment in the AF amplifier stage via a control signal, which is derived from this detection, for adjustment of the gain factor.

In one simple and expedient embodiment, the transmitter capsule of the telephone is directly followed by a level or voltage measurement device, which detects the speech volume.

Adapted processing of the primary measurement signal in order to avoid undesirable gain changes and control oscillations in the speech/listening system resulting from natural volume fluctuations while the user is speaking and during pauses in speech require a certain amount of care. For this purpose, the volume signal must expediently first of all be averaged using a suitably selected time constant, for example in the region of seconds. Pauses in speech must be considered separately, for example by deactivation of the signal evaluation when a predetermined threshold level is undershot. In general, the established mobile radio standards provide functions which can be used for this purpose. For example, the functionality of a GSM voice coder and decoder (CODEC) include what is referred to as the DTX Mode (Discontinuous Transmission), in which the transmitter is activated only when a specific speech frame (20 ms for GMS) actually includes spoken information. In principal, this function also can be used to exclude pauses in the user's speech from the evaluation of the speech volume.

In an embodiment which can be flexibly matched to the normal speech characteristics of the user or to the area in which the telephone is being operated at that time, the averaging interval and/or the deactivation threshold value are/is adjustable manually or under menu control. Thus, for example, the deactivation threshold value can be increased when using a mobile station with a sensitive transmitter capsule when the environmental volume level is high (in traffic concentrations, in production areas where the noise levels are high, in coastal areas etc.), to take account of this, and the individual adjustment of the averaging interval allows the preselection of a fairly sensitive or inert response for the gain setting, as a function of the user's personal lifestyle.

In a further advantageous embodiment, parts for detecting the speech volume or for gain adjustment are designed such that they can be switched off as a function thereof, so that the telephone also can be operated with a fixed AF gain setting, or can be changed to manual gain adjustment.

In a further embodiment, the area in which the volume level of the receiver capsule can vary as a function of the environmental noise can be predetermined as a subregion ("window") within the overall range of the feasible receiver capsule volume, or the overall AF level range. In addition, in this embodiment, the presence of parts for shifting this window, as required, within the overall level range is advantageous. The parts for carrying out this shift can once again be operated manually by a switch, or under menu control. As an alternative to this, automatic shifting is feasible, as a function of a defined parameter, for example the reception field strength in a mobile station.

Detection of the dynamic response in the user's speech can also, in one specific embodiment, provide an additional control signal not only for positioning the "level window" but also for specific adaptive averaging of the speech volume.

One advantageous development of the present invention also provides for the effect of varying the speech volume when the environmental noise level changes, which is irritating to the conversation partner in a telephone connection (and which the other subscriber receives only to a very restricted extent especially when using a noise-compensated microphone in the transmitter capsule of his conversation partner) to be at least partially compensated for. For this purpose, a control stage is expediently provided which is connected to the input of the AF amplifier stage, where the undesirably fluctuating signal level is present.

In one preferred embodiment, this control stage also can be selectively activated or deactivated via a switching element or under menu control, in order to allow matching to the user's listening characteristics.

Additional features and advantages of the present invention are described in, and will be apparent from, the following Detailed Description of the Invention and the Figures.

BRIEF DESCRIPTION OF THE FIGURES

FIG. 1 shows in block diagram form various components of a mobile telephone to which the present invention is directed.

DETAILED DESCRIPTION OF THE INVENTION

FIG. 1 shows, in the highly simplified form of a functional block diagram, those components which are essential to the explanation of the present invention in a mobile telephone 1, including a receiver capsule 3 with a load speaker 3a, a transmitter capsule 5 with a noise-compensated microphone 5a, and an AF amplifier stage 7 with an AF signal input 7a.

In addition to being connected to the AF amplifier stage 7, the AF signal input 7a is connected via a first electronically controllable switch 9 to an AF level control stage 11, whose output is connected to a first control input 7b of the AF amplifier stage 7.

The transmitter capsule 5 is connected via a second electronically controllable switch 13 to a voltage measuring device 15 for detecting the actual level of the speech volume at the microphone 5a. The output of the voltage measuring device 15 is connected to an averaging stage 17, which is connected via a control input to the output of an averaging interval adjustment device 19. On the output side, the averaging stage 17 is connected firstly to a gain adjustment stage 21, and secondly to one input of a speech level component unit 23, whose other input is connected to a speech level threshold value memory 25, and whose output is connected via a third electronically controllable switch 27, for control signal purposes, to a fourth switch 29, which makes or breaks the connection between the averaging stage 17 and the gain adjustment stage 21 as a function of the output signal from the speech level comparator unit 23 and the position of the third switch 27.

The gain adjustment stage 21 is associated, via a control input, with a gain range preselection stage 31, and the gain selection stage is connected on the output side to a second control input 7c of the AF amplifier stage 7. The output of the AF amplifier stage 7 is connected to the loudspeaker 3a of the receiving capsule 3.

The first, second and fourth controllable switches 9, 13 and 29 as well as the averaging interval adjustment device 19 and the gain range preselection stage 31 are actuated via a microcontroller 33 of the mobile telephone, which is connected in the normal way to its input keypad or keyboard 35 and to the display 37, and which has an associated program memory area (ROM) 33a and a main memory area (RAM) 33b.

This arrangement operates as follows: the AF level control stage 11, which fundamentally operates in the same way as automatic level control, as is known per se, produces (depending on the specific configuration) partial or complete compensation for fluctuations in the input level at the AF signal input 7a, provided the first switch 9 is closed, and this function is hence activated. This compensates, in particular, for increases or reductions in the speech volume of the conversation partner in a telephone connection resulting from environmental noise.

If the second switch 13 is closed, and the function of automatic matching of the receiver volume to the speech volume is thus activated, the voltage measuring device 15 detects the speech volume level, with the output signal from the voltage measuring device being subjected in the averaging stage 17 to averaging using an averaging time interval which is preselected via the averaging interval adjustment device 19 and is preferably in the range between 1 and 10s. This prevents the AF gain from being influenced by brief pauses in speech between individual words or sentences or by natural level fluctuations in the course of the conversation, with the preselection of an averaging time interval via the keyboard or keypad 35, the microcontroller 33 and the averaging interval adjustment device 19 allowing specific matching to normal speech characteristics of the user or the specific situation in which the mobile telephone is being operated.

The output signal from the averaging stage 17 is subjected, in the speech level comparator unit 23, to level discrimination using a threshold value that is stored in the speech level threshold value memory, provided this function is activated by closing the third switch 27. If the volume level of the microphone 5a falls below the predetermined threshold value, then opening the fourth switch 29 results in the corresponding conversation phase being excluded from the automatic gain adjustment process. As soon as the speech level is once again above the threshold value, the output signal from the comparator unit 23 changes, following which the fourth switch 29 is closed again, and the subsequent phase of the conversation is included in the process by transmitting the output signals from the averaging stage 17 to the gain adjustment stage 21 for the AF gain adjustment.

In addition, as for the other functions and possibly including menu control with the aid of the display 37, the gain range preselection stage 31 also results in preselection, via the keyboard or keypad 35 and the microcontroller 33, of a gain range or "level window" within whose boundaries the gain adjustment stage 21 is intended, in response to the output signal from the averaging stage 17, to adjust the gain of the AF amplifier stage 7 via its second control input 7c.

The embodiment of the present invention is not restricted to the described exemplary embodiment, but is also feasible in a large number of modified versions. For example, in simplified embodiments, there is no need for some or else all of the described switching and adjustment functions, or these functions can be provided by conventional electrical switches or adjustment controllers. The present invention can be implemented not only in a mobile telephone but also, in particular, in a cordless telephone or in a normal land line terminal.

It is self-evident that the described functions can to some extent be implemented in the form of software. In this context, the wide range of speech processing functions in the protocols of modern mobile radio systems offer worthwhile capabilities which largely results in there being no need for any additional hardware complexity. If a digital signal processor (DSP) is available, the functions described above can be carried out with high precision, and dependent only on the software.

The method of the present invention can be applied, in addition to telephones, in general to all communications appliances using simplex or duplex speech operation (that is to says also including, for example, door interphones or the like).

Although the present invention has been described with reference to specific embodiments, those of skill in the art will recognize that changes may be made thereto without departing from the spirit and scope of the invention as set forth in the hereafter appended claims.

What is claimed is:

1. A communications terminal, comprising:
   a transmitter capsule;
   a receiver capsule;
   an AF amplifier stage, operatively coupled to the transmitter and receiver capsules;
   a gain adjustment stage for varying a gain factor of the AF amplifier stage in order to adjust receiver volume;
   a speech volume detection device operatively coupled to the gain adjustment stage; and
   a voltage measurement device as part of the speech volume detection device, the voltage measurement device being associated with the transmitter capsule and having a downstream averaging stage for averaging the detected speech volume, wherein the gain factor of the AF amplifier stage is adjusted as a function of averaged speech volume.

2. A communications terminal as claimed in claim 1, wherein the communications terminal is a mobile radio station.

3. A communications terminal as claimed in claim 1, wherein the downstream averaging stage has an averaging interval between 1 and 10s.

4. A communications terminal as claimed in claim 1, further comprising:
   an averaging interval adjustment device which is operable either manually or under menu control via an operation control unit.

5. A communications terminal as claimed in claim 4, wherein the averaging interval adjustment device and the gain range preselection stage have a control signal input for automatic activation and adjustment as a function of a control signal produced outside the AF amplifier stage.

6. A communications terminal as claimed in claim 1, further comprising:
   a switch which is operable either manually or under menu control via an operation control unit for activation and deactivation of either the speech volume detection device or the gain adjustment stage.

7. A communications terminal as claimed in claim 1, further comprising:
   a processor associated with the speech volume detection device for taking account of pauses in speech.

8. A communications terminal as claimed in claim 1, wherein the gain adjustment stage includes a gain range preselection stage for defining an adjustment window within an overall variation range of the gain factor.

9. A communications terminal as claimed in claim 8, wherein the gain range preselection stage is operable either manually or under menu control via an operation control unit.

10. A communications terminal as claimed in claim 1, further comprising:
    a gain control stage for at least partial compensation for level changes at a signal input of the AF amplifier stage.

11. A communications terminal as claimed in claim 10, wherein the gain control stage is operable either manually via a switching element or under menu control via an operation control unit.

* * * * *